United States Patent Office 3,041,141
Patented June 26, 1962

3,041,141
PROCESS OF PURIFYING SILANE
Carlyle E. Shoemaker and Gene Sumrell, Easton, Pa., assignors to J. T. Baker Chemical Company
No Drawing. Filed Sept. 6, 1955, Ser. No. 532,746
3 Claims. (Cl. 23—204)

Our invention relates to the purification of silane. In particular, our invention relates to the removal of boron constituents from silane.

The preparation of pure silicon is difficult. Pure silicon is required for use, for example, in making improved transistors and other semi-conductor devices. Silicon is particularly advantageous for this use because it can be used at much higher temperatures than other materials such as germanium. It is difficult, however, to prepare silicon in a state pure enough for use. In particular, boron which is commonly associated with all forms of silicon and its compounds can only be removed with great difficulty. For certain uses the boron content of the silicon should be in the order of a few parts per billion for best results.

Silane, i.e. silicon tetrahydride, is used as a source of silicon by thermally decomposing the silane. It is imperative to remove all traces of boron before the silicon is formed, and this is difficult to do by conventional methods. Previously, silane has been condensed and fractionally distilled for purification. This method is inconvenient, troublesome and dangerous since silane burns explosively upon contact with air. Moreover, the fractional distillation does not easily separate an impurity with a similar boiling point such as some boron hydrides. For example, diborane is separated only with great difficulty by distillation from silane because of the similar boiling points.

We have found that silane is effectively purified, i.e. boron constituents associated therewith are removed, by contacting the silane with an amine. According to our invention, the silane in association with the boron constituents is contacted with an amine and the silane is recovered. The amine is used alone or in a solution of a suitable inert organic solvent, e.g. ethyl ether. One particularly advantageous method is to bubble the silane gases through a liquid trap containing a solution of the amine. A series of such traps is advantageous in increasing the degree of separations. Thus, the silane gas stream can be continuously purified. While the boron impurities usually associated with silane consists primarily of the boron hydrides, by the term boron constituents we mean to include boron and its compounds generally. The products of reaction of the amines and boron constituents are surprisingly not volatile and thus form compounds readily separable from the silane and do not contaminate the silane.

The amines suitable for use in our invention are primary, secondary and tertiary aliphatic, alicyclic, aromatic and heterocyclic amines. Among the useful primary amines are ethyl amine, propyl amine, butyl amine, ethylene diamine and aniline. Among the useful secondary amines are diethyl amine, piperidine and methyl aniline. Among the useful tertiary amines are triethylamine and pyridine. Triethylamine is particularly advantageous. The amines advantageously have a low melting point and a high boiling point.

Suitable inert organic solvents for use in the process include ethers such as, for example, diethyl ether, ethylene glycol dimethyl ether, and dioxane, and hydrocarbons such as, for example, toluene, benzene, kerosene and hexane.

The temperature range used in carrying out the process of our invention is from about $-100°$ C. to about $25°$ C. The temperature range is limited at its higher value by the vapor pressure of the solution. Thus if the temperature were too high, too much liquid would evaporate from the liquid trap. In general, temperatures of about 0 to $25°$ C. approach the highest useful values. If the liquid trap were too cold silane would become very soluble in the solutions and begin to condense. Thus, a temperature of about $-100°$ C. approaches the useful lower limit.

One of the convenient methods for making silane is by the following reaction:

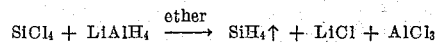

The silane is then thermally decomposed to give silicon and hydrogen. In one such decomposition the silicon tetrachloride, lithium aluminum hydride and the resultant silicon were analyzed for boron by the spectrograph. 0.001 to 0.01 percent boron was found in the lithium aluminum hydride, 0.001 to 0.01 percent in the silicon tetrachloride and 0.01 to less than 0.001 percent in the silicon.

In the silicon tetrachloride, the boron is probably present as the chloride while in the lithium aluminum hydride it is probably a hydride salt. Both would react to produce boron hydrides according to the following equations:

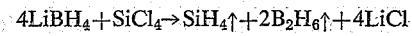

In addition to the diborane ($B_2H_6$), other boron hydrides might also be formed, for example, tetraborane ($B_4H_{10}$).

The process of our invention will be further illustrated by reference to the following examples.

*Example I*

A generator was prepared somewhat similar to that described by Finhold, Bond, Wilzbach, Schlesinger, J. Am. Chem. Soc. 69, 2692 (1947), by fitting a dropping funnel to a 1-liter three-neck flask. An argon gas inlet was provided for the second opening and an exhaust outlet was fixed for the third opening. The reaction mixture was stirred by a magnetic stirrer and cooled by ice surrounding the flask. In addition to the generator there was, in order, a safety trap (to prevent liquid from the next strap from siphoning back into the generator), a liquid trap (in this case empty), two drying traps cooled to $-78°$ C. or below to remove ether, a furnace and a safety exit. Mercury filled manometers which would release pressure but withstand a vacuum were connected to the apparatus in several places. The safety exit consisted of a tube which discharges silane under water. The exit of the tube will not clog (with $SiO_2$) when the silane is released in this manner. The clean, dry and gas-tight apparatus was flushed with an inert gas such as nitrogen or argon.

(*Warning*: Silane must never be allowed to come in contact with air inside any apparatus, under any condition. A violent explosion will result!) Lithium aluminum hydride (3.0 grams) and sodium borohydride (0.5 gram) were added to the generator and the apparatus again flushed with inert gas. Thirty ml. of ether were added to the generator through the dropping funnel. To an additional 30 ml. portion of ether, 7.5 ml. of silicon tetrachloride were dissolved. This solution was added dropwise through the dropping funnel to the mixture of lithium aluminum hydride and sodium borohydride. The generated gases were dried and decomposed thermally. The thermal decomposition was accomplished by heating the gases in a gas-tight tube heated to between 500 and $1000°$ C. The apparatus was flushed again with an inert gas before disassembling. The boron analysis as determined by the spectrograph was in the higher portion of the region 0.3–3.0%.

Example II

In a subsequent experiment using the same experimental technique, apparatus and chemicals of Example I, the liquid trap was used after the generator. The generated silane gases were bubbled through this trap containing a solution of 80 ml. of ether and 10 ml. of triethylamine maintained at −78° C. The recovered silane was then decomposed thermally and analyzed as before. The boron analysis was in the lower range of 0.001 to 0.01%. The boron content was lowered to at least 1/300 of its former value.

Example III

Another experiment was tried using the procedure of Example II whereby the temperature in the liquid trap was held at 0° C. Boron was not even detected in the product. The lower limit of detection was reported to be 0.001%.

Thus, the method of our invention provides an effective and advantageous method of removing boron constituents from silane, in which boron constituents are selectively absorbed and rendered nonvolatile by reaction with an amine, to produce silane containing less than a few parts per billion of boron. The amines are also advantageous in that they provide an anhydrous medium. Such silane is particularly advantageous for preparing pure silicon by thermal decomposition.

We claim:

1. A method of preparing silane free from boron hydrides which comprises passing a stream of silane gas contaminated with boron hydrides through a non-aqueous solution of an amine dissolved in an inert liquid organic solvent at a temperature within the range of about −100° C. to 25° C., whereby the boron hydrides present in said gaseous mixture react with said amine to form nonvolatile products, and thereafter removing the gaseous silane from contact with said amine and recovering the said silane in purified form.

2. A method in accordance with claim 1 in which the amine is tri-ethyl amine.

3. A method in accordance with claim 1 in which the contaminated silane gas is bubbled through a trap containing an anhydrous solution of an amine reactive with boron hydrides.

References Cited in the file of this patent

UNITED STATES PATENTS

| 1,783,901 | Bottoms | Dec. 2, 1930 |
| 2,400,874 | Burk | May 28, 1946 |

FOREIGN PATENTS

| 501,670 | Great Britain | Mar. 3, 1939 |

OTHER REFERENCES

Hurd: "Chemistry of the Hydrides," 1952, page 105.

Schechter et al.: "Boron Hydrides and Related Compounds," prepared under Contract NOa(s)10992 for Dept. of the Navy, Bur. of Aeronautics, prepared by Callery Chemical Co., declassified December 1953, page 28.

Borwasserstoffe, VI: Die einfachsten Borohydride, by A. Stock et al., published in Deutsche Chemische Gesellschaft Berichte, vol. 56 (1923), page 789.